(12) United States Patent
Newman (10) Patent No.: US 10,067,719 B1
(45) Date of Patent: Sep. 4, 2018

(54) METHODS AND SYSTEMS FOR STORING AND ACCESSING DATA IN A DISTRIBUTED DATA STORAGE SYSTEM

(71) Applicant: XANADU BIG DATA, LLC, Lexington, MA (US)

(72) Inventor: Rhys Andrew Newman, Oxon (GB)

(73) Assignee: XANADU BIG DATA, LLC, Lexington, MA (US)

( * ) Notice: Subject to any disclaimer, the term of this patent is extended or adjusted under 35 U.S.C. 154(b) by 0 days.

(21) Appl. No.: 15/691,170

(22) Filed: Aug. 30, 2017

(51) Int. Cl.
*G06F 3/06* (2006.01)

(52) U.S. Cl.
CPC .......... *G06F 3/0659* (2013.01); *G06F 3/0604* (2013.01); *G06F 3/067* (2013.01)

(58) Field of Classification Search
CPC ....... G06F 3/0659; G06F 3/0604; G06F 3/067
See application file for complete search history.

(56) References Cited

U.S. PATENT DOCUMENTS

| | | | | |
|---|---|---|---|---|
| 9,021,296 B1* | 4/2015 | Kiselev | ............... | H03M 13/154 714/6.23 |
| 2002/0199060 A1* | 12/2002 | Peters | ................. | G06F 11/1076 711/114 |
| 2008/0201336 A1* | 8/2008 | Yamato | ............. | G06F 17/30067 |
| 2013/0263151 A1 | 10/2013 | Li et al. | | |
| 2014/0281215 A1* | 9/2014 | Chen | ........................ | G06F 17/30 711/112 |
| 2014/0351510 A1* | 11/2014 | Chiu | ...................... | G06F 3/0659 711/114 |
| 2017/0083603 A1 | 3/2017 | Minder et al. | | |
| 2017/0139823 A1* | 5/2017 | Tomlin | .................. | G06F 3/0611 |

OTHER PUBLICATIONS

Weil et al. CRUSH: controlled, scalable, decentralized placement of replicated data. In Proceedings of the 2006 ACM/IEEE conference on Supercomputing (SC '06). ACM, New York, NY, USA, Article 122. DOI: https://doi.org/10.1145/1188455.1188582 (Year: 2006).*

(Continued)

*Primary Examiner* — Mano Padmanabhan
*Assistant Examiner* — William E. Baughman
(74) *Attorney, Agent, or Firm* — Nutter McClennen & Fish LLP; John J. Penny, Jr.

(57) ABSTRACT

The present disclosure provides methods and systems for storing and accessing data in a distributed data storage system. The distributed data storage system includes a plurality of data storage nodes. The method includes receiving a data storing request. Then, a pseudo-random sequence of data storage nodes of the plurality of data storage nodes is generated, wherein the pseudo-random sequence is not sequential from any starting position and each data storage node of the pseudo-random sequence of data storage nodes is determined using a pre-determined pseudo-random function that is a function of a data reference. Finally, a data is stored into at least one data storage node of the pseudo-random sequence of data storage nodes based on a pre-defined selection criteria. The distributed data storage system includes an access server configured to store into and access data from at least one data storage node of data storage nodes.

15 Claims, 5 Drawing Sheets

Exemplary Table

| Data Hash Value (Hash bin) | 8 Node Permutation | Actual Sequence with 4 nodes |
|---|---|---|
| 0 | 6 0 1 5 7 3 2 4 | 6 0 1 5 |
| 1 | 2 0 4 3 5 7 1 6 | 2 0 4 3 |
| 2 | 0 3 5 2 6 1 4 7  *304b* | 0 3 5 2 |
| 3 | 1 3 2 0 7 6 5 4 | 1 3 2 0 |
| 4 | 0 2 4 5 7 6 1 3  *304c* | 0 2 4 5 |
| 5 | 5 0 4 7 2 3 1 6 | 5 0 4 7 |
| 6 | 0 1 2 4 6 3 5 7  *304d* | 0 1 2 4 |
| 7 | 2 6 0 3 7 4 1 5 | 2 6 0 3 |

(56) References Cited

OTHER PUBLICATIONS

Decandia, G., et al., Dynamo: Amazon's highly available key-value store. SOSP '07, Proceedings of 21st ACM SIGOPS Symposium on Operating System Principles, Oct. 14-17, 2007, Stevenson, Washington, pp. 205-220.

MacCormick, J., et al., Kinesis: A new approach to replica placement in distributed storage systems. ACM Trans. Storage, 4, 4, Article 11 (Jan. 2009) 28 pages. DOI = 10.1145/1480439.1480440, <http://doi.acm.org/10.1145/1480439.1480440>.

* cited by examiner

Exemplary Table

| Data Hash Value (Hash bin) | 8 Node Permutation | Actual Sequence with 4 nodes |
|---|---|---|
| 0 | 60157324 | 6015 |
| 1 | 20435716 | 2043 |
| 2 | 03526147  304b | 0352 |
| 3 | 13207654 | 1320 |
| 4 | 02457613  304c | 0245 |
| 5 | 50472316 | 5047 |
| 6 | 01246357  304d | 0124 |
| 7 | 26037415 | 2603 |

METHODS AND SYSTEMS FOR STORING AND ACCESSING DATA IN A DISTRIBUTED DATA STORAGE SYSTEM

TECHNICAL FIELD

The present disclosure generally relates to the field of data storage, and in particular, the present disclosure relates to methods and systems for storing and accessing data in a distributed data storage system.

BACKGROUND

Due to the ever increasing demand for data storage in today's digital world, distributed storage systems have received a lot of attention. In the distributed storage system, data as a whole or different portions of the data is spread over several physically separate computer storage servers (also known as storage nodes). The total storage capacity of the distributed storage system is designed to be much greater than that of a single storage node—i.e., the sum of the storage of all individual storage nodes. With many physical servers in the highly distributed storage system, there is a relative increase in the possibility of failure—temporary or permanent as compared to a single storage node. If a node with some fraction of the data stored becomes unavailable for any reason, the distributed storage system provides the data from an alternative node (i.e., any other nodes part of the distributed storage system). In this manner, the required data is accessible by clients via the alternative node.

Clients accessing data prefer to know which storage nodes have copies so that multiple alternatives can be tried. As per known methods, there are two mechanisms that enable the clients to find out where the data is located—one is to ask a known authority node/central node, and second is to find out directly from the data reference/address. The former way is not fault-tolerant as the central node may fail, then all storage nodes become inaccessible. The second way is preferred in large horizontally scalable systems.

One way to find out the data reference is via a consistent hashing. Consistent hashing is a way to locate data amongst a number of distributed nodes in the storage system, where the client is enabled to know exactly which nodes to be contacted without any central authority. Many systems that use consistent hashing view the numeric data reference address as a number that describes a position on a circle, the circle includes a number of storage nodes in a pre-defined fashion. A reference typically ranges from 0 to a large integer (often $2^n$ for some n) and a node ID is labeled on multiple positions around the circle. To find the data, the client starts at the position pointed to by the data reference and moves clockwise around the circle of potential positions until a valid (non-null) node ID is found. The node which is found and the next N nodes (N being the known number of redundant copies of data) further around from this one in the same direction are the nodes that contain the required data.

The physical nodes/devices are given IDs on this numeric circle to ensure that redundant copies of the data, when placed on a contiguous number of nodes in the circular ordering, are in fact on physical devices that are unlikely to suffer a coincident or correlated failure. This is to minimize the chance that all N copies of the data will become unavailable if one (or a small number) of nodes fail.

In general all data placement schemes follow the basic method of first calculating the initial position of the data in the circular hashing space (i.e. locate the starting position on this circle of potential node IDs). Then, count incrementally around the circle from this position to find (for storing) the required IDs of nodes that store the data. For reading data, the first node that all is required.

Once the starting position is found, the series of nodes that store the redundant copies is identical in these schemes. This approach is vulnerable to the problem of cascading failure, where the failure of a node causes all the clients to pass their requests onto another next node which can result in increasing the load on the node sufficient to make it fail. This effect then continues to another next node in an amplified way, thus increasing the chances of a total system failure.

Some solutions randomize the order of nodes around the circle so the sequence is not always fixed as read in a clockwise fashion. However, even with such arrangements it is still the case that a single node failure causes uneven distribution of load to other nodes.

Since issues of data storage arise almost everywhere in the modern world, there is a need for better methods and systems.

SUMMARY

An embodiment of the present disclosure discloses a method for storing data in a distributed data storage system. The distributed data storage system includes a plurality of data storage nodes. The method includes receiving a data storing request to store a block of data. Then, a pseudo-random sequence of data storage nodes of the plurality of data storage nodes is generated, wherein the pseudo-random sequence is not sequential from any starting position and each data storage node of the pseudo-random sequence of data storage nodes is determined using a pre-determined pseudo-random function that is a function of a data reference. The block of data is stored into at least one data storage node of the pseudo-random sequence of data storage nodes based on a pre-defined selection criteria.

Another embodiment discloses a method for accessing data in a distributed data storage system, the distributed data storage system includes a plurality of data storage nodes. The method includes receiving a data accessing request to access a block of data. Then, a pseudo-random sequence of data storage nodes of the plurality of data storage nodes is generated, the pseudo-random sequence is not sequential from any starting position and each data storage node of the pseudo-random sequence of data storage nodes is determined using a pre-determined pseudo-random function that is a function of a data reference. At least one data storage node of the pseudo-random sequence of data storage nodes is accessed.

A further embodiment describes a non-transitory computer readable medium for storing and accessing data in a distributed data storage system, the distributed data storage system including a plurality of data storage nodes, the non-transitory computer readable medium comprising a set of computer-executable instructions for performing a method comprising receiving a data storing request to store a block of data, generating a pseudo-random sequence of data storage nodes of the plurality of data storage nodes, wherein the pseudo-random sequence is not sequential from any starting position and each data storage node of the pseudo-random sequence of data storage nodes is determined using a pre-determined pseudo-random function that is a function of a data reference, and storing the block of data into at least one data storage node of the pseudo-random sequence of data storage nodes based on a pre-defined selection criteria.

An additional embodiment describes a distributed data storage system configured to store and access data. The distributed data storage system includes a plurality of data storage nodes and an access server. The access server is configured to receive a data storing request to store a block of data, to generate a pseudo-random sequence of data storage nodes of the plurality of data storage nodes, wherein the pseudo-random sequence is not sequential from any starting position and each data storage node of the pseudo-random sequence of data storage nodes is determined using a pre-determined pseudo-random function that is a function of a data reference, and to store the block of data into at least one data storage node of the pseudo-random sequence of data storage nodes based on a pre-defined selection criteria.

DETAILED DESCRIPTION

The present disclosure will now be described more fully with reference to the accompanying drawings, in which embodiments of the present disclosure are shown. However, this disclosure should not be construed as limited to the embodiments set forth herein. Rather, these embodiments are provided so that this disclosure will be thorough and complete, and will fully convey the scope of the present disclosure to those skilled in the art like numbers refer to like elements throughout.

The present disclosure implements a scheme to represent storage nodes in an optimal fashion with respect to fault tolerance, access speed and other design requirements (any requirements that change during the system operation such as load, capacity etc.). Specifically, the present disclosure provides a scheme to place data to data storage nodes such that a pseudo-random sequence, which is not sequential from any starting position, of data storage nodes provides even distribution of data load to storage nodes even if one or some of data storage nodes are failed. Therefore, present disclosure's data placement scheme provides a distributed data storage system having a number of storage nodes such that unavailability of any data stored on one or more nodes is minimized, storage usage is maximized and/or the impact of cascading node failures is minimized.

Exemplary Environment

Figure 1:
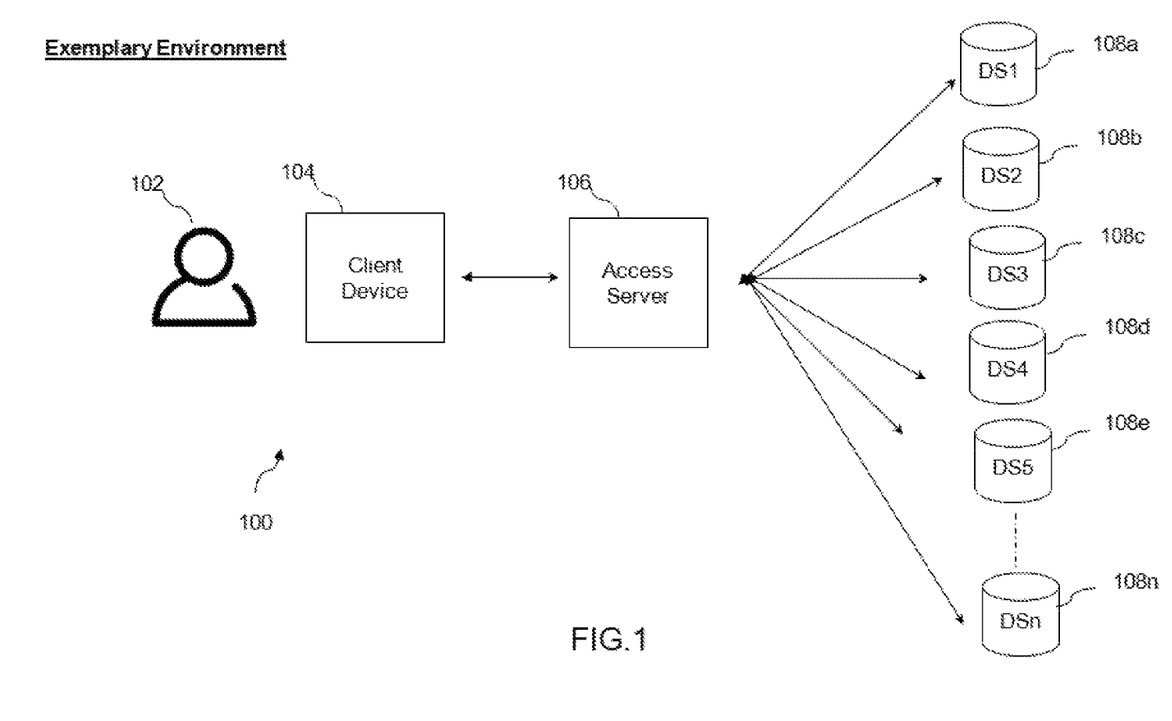
FIG. 1 illustrates an exemplary environment in which various embodiments of the present disclosure can be practiced.

FIG. 1 illustrates an exemplary environment 100 in which various embodiments of the present disclosure may be practiced. The exemplary environment 100 may represent a distributed data storage system such as network attached storage (NAS), storage area networks (SANs), or cloud based storage (e.g., Internet area network (IAN) storage systems), among others. The distributed data storage system may provide storage of large amounts of electronic data. Such storage system may be configured to store electronic data of one or more users/devices and to access the stored electronic data.

As shown, FIG. 1 includes a user 102, a client device 104, an access server 106 and a number of data storage nodes such as 108*a*, 108*b*, 108*c*, 108*d*, 108*e* . . . 108*n* (collectively 108), where n defines any arbitrary number. The client device 104 is communicatively coupled to the access server 106 and the access server 106 is further communicatively coupled to the data storage nodes 108 over a network (although not shown). The network may be any suitable wired network, wireless network, a combination of these or any other conventional network, without limiting the scope of the present disclosure. Examples may include a Local Area Network (LAN), wireless LAN connection, an Internet connection, a point-to-point connection, or other network connection and combinations thereof. The network may be any other type of network that is capable of transmitting or receiving data to/from host computers, storage devices, personal devices, telephones, video/image capturing devices, video/image servers, or any other electronic devices. Further, the network may be capable of transmitting/sending data between the mentioned devices. Additionally, the network may be a local, regional, or global communication network, for example, an enterprise telecommunication network, the Internet, a global mobile communication network, or any combination of similar networks. The network may be a combination of an enterprise network (or the Internet) and a cellular network, in which case, suitable systems and methods are employed to seamlessly communicate between the two networks. In such cases, a mobile switching gateway may be utilized to communicate with a computer network gateway to pass data between the two networks. The network may include any software, hardware, or computer applications that can provide a medium to exchange signals or data in any of the formats known in the art, related art, or developed later.

The user 102 may use the client device 104 for his day-to-day tasks such as emails, surfing, social networking, etc. Examples of the client device 104 may include, but not limited to, a computing device, a mobile device, a PDA (personal digital assistant), a tablet, an Internet appliance, a laptop, a mainframe computer, a smart phone, a server computer, or the like. The client device 104 may access data stored over the storage nodes 108 as shown in FIG. 1. In particular, the client device 104 may write and read data to and from the data storage nodes 108 via the access server 106. The client device 104 may be located remotely from the data storage nodes 108. While in other examples, the client device 104 may be located locally.

The data storage nodes 108 may be embedded in a computing device. In other examples, the data storage nodes 108 may represent an external hard-disk drive, a USB flash drive, a memory card, a Compact Disk, a server, a Digital Versatile Desk, etc. The data storage nodes 108 store data in various forms, such as raw data (e.g., data collected from sensors, a traffic monitoring system, control systems, a surveillance system, a security system, a toll fee system or the like), processed data (e.g., metrics or other results generated from raw data, data aggregations, filtered data, etc.), developed content (e.g., documents, photographs, video, audio, etc.), and/or the like. In an example, all the data storage nodes 108 may be present at a single location, while in other example, the data storage nodes 108 may be distributed geographically. Each data storage node 108 is associated with a unique identifier i.e., node ID for identification by the client device 104 or other client devices (although not shown).

The access server 106 acts an intermediate between the client device 104 and the data storage nodes 108. The access server 106 performs the read and write operation for the client device 104. The access server 106 may be present at a location of the client device 104. While, the access server 106 may be located remotely from the client device 104. The access server 106 may be embedded in client device 104 or data storage nodes 108.

In the context of the present disclosure, a pseudo-random sequence of data storage nodes of the multiple data storage nodes 108 may be generated. The pseudo-random sequence is unique for each unique block of data; that is no single sequence will be the same for two differing blocks of data. If the client device 104 sends a request for storing the data, the first available node of the pseudo-random sequence storage nodes is selected for storage and a replica of the data is stored on each subsequent data storage node of the pseudo-random sequence data storage nodes based on a pre-defined selection criteria i.e., to minimize the impact of data storage node failure, maximize access speed and maximize data security. When the client device 104 sends an access request for the data, the client device 104 may access at least one storage node of the pseudo-random sequence storage nodes.

Exemplary Embodiments

Exemplary System

Figure 2:
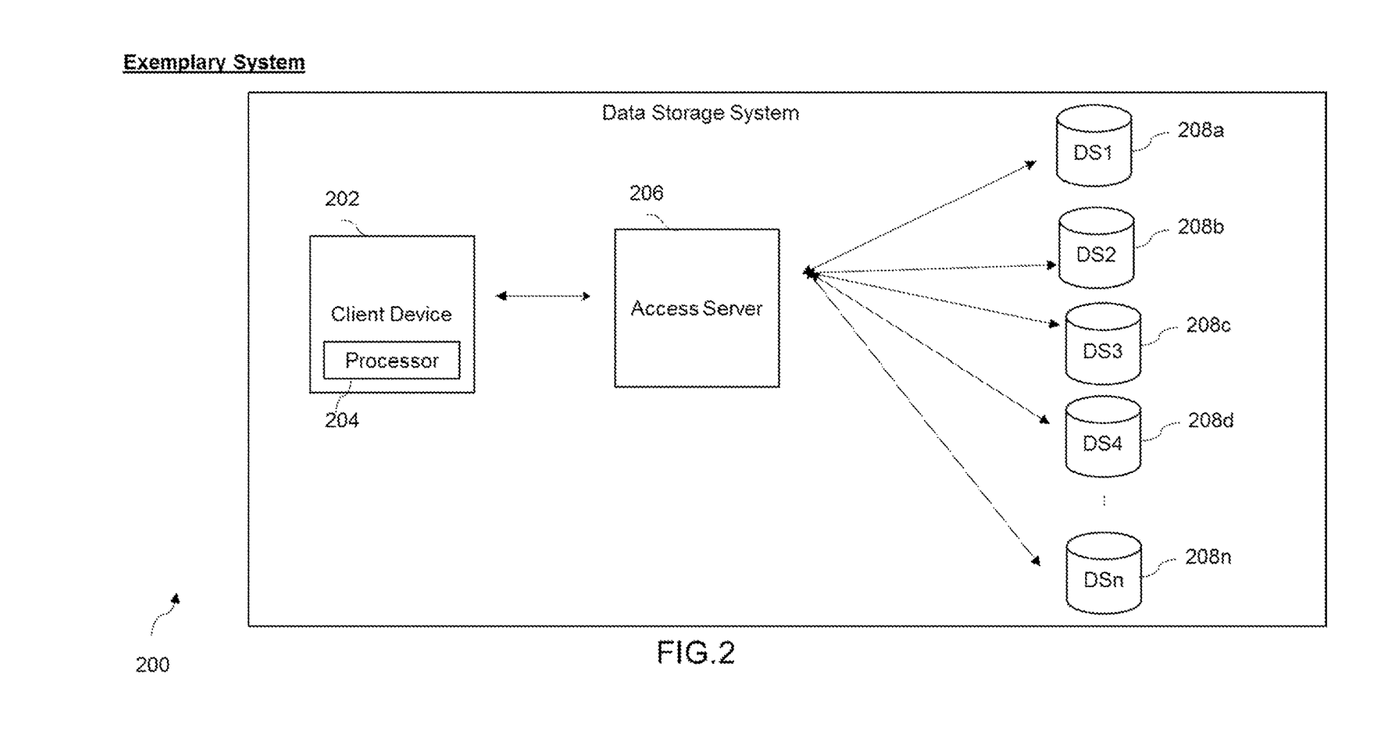
FIG. 2 illustrates an overall system for accessing and storing data stored in a distributed storage system, according to an embodiment of the present disclosure.

FIG. 2 shows an exemplary distributed data storage system 200. The distributed data storage system 200 includes a client device 202 having a processor 204, an access server 206 and a plurality of data storage nodes 208a, 208b, 208c, 208d . . . and 208n (collectively 208), where n is any arbitrary number. Each of the components 202, 204, 206 and 208 are connected to each other using suitable network such as a wired network, wireless, or a combination thereof as discussed above.

Although not shown, the client device 202 includes an input unit, and an output unit such as a display. The input unit, output unit and the processor 204 are the components coupled to each other via a suitable bus or known network protocols. The input unit and the output unit are known, thus no details are needed.

The access server 206 is an intermediate between the client device 202 and the data storage nodes 208. An application runs on the access server 206 having an application program interface (API). The API handles data store and retrieve requests received from the client device 202 and performs data store and retrieve operation for the client device 202.

It may be understood that in an exemplary embodiment, the components 202-208 may be in the form of hardware components, while in another exemplary embodiment, the components 202-208 may be in the form of software entities/modules. In yet another exemplary embodiment, the components may be a combination of hardware and software modules. The components 202-208 are configured to send data or receive data to/from each other by means of wired or wireless connections.

Data Storage Node

As shown in FIG. 2, the data storage nodes 208 store data related to the client device 202. Each storage node 208 is associated with a unique node identifier (i.e., node ID). The storage nodes at which a particular piece of data is stored is defined by a pseudo-random sequence of storage nodes (referred to by their node identifiers) which is derived from the data content and, optionally, other externally known information (e.g. time). The pseudo-random sequence is generated using a pre-determined pseudo-random function. The pre-determined pseudo-random function is selected to generate the pseudo-random sequence that is not sequential from any starting position.

One example of the pre-determined pseudo-random function is PERMUTE function. Further, the pre-determined pseudo-random function is a function of a data reference. The data reference corresponds to a hash code generated using a hashing algorithm on the data. The hash code includes MD5 hash code.

The data storage node identifier is represented as below:

$$\text{Node\_ID} = \text{PERMUTE}(\text{data\_reference})[\text{counter}] \quad \text{Equation (1)}$$

In Equation (1), Node_ID is the identifier of the data storage node such as a node 208a, data_reference is a hash code of data bytes and counter is an incrementing value starting from 0 and increasing by one each time.

For example, in case of 3 redundant data copies to be stored, Node_ID_1=PERMUTE(Hash(data bytes))[0], Node_ID_2=PERMUTE(Hash(data bytes))[1], and Node_ID_3=PERMUTE(Hash(data bytes))[2]

The PERMUTE is any high quality pseudo-random permutation that ensures the Node_ID for each sequential counter value is virtually random compared to the previous value. Thus the sequence of Node_IDs that any data reference can be stored on is virtually unique, and thus, the impact of a given node failure is shared much more evenly than in traditional systems. For example using 16 bits of the content hash code, it can be considered that there are 64K data storage nodes and by default there are 64K data storage IDs. Accordingly, the probability of a given sequence with 64K storage nodes is ~1/64000, and thus the impact of a given data storage node failure is shared much more evenly than in known systems.

The PERMUTE function makes a pseudo random sequence that allows the client device 202 to know which data storage node 208 to access for the data retrieval without any external input. The Node_ID sequence onto which any data is stored is generated by the client device 202 before contacting any server—it can do this because it too knows the PERMUTE algorithm and the data reference (and any other optional and externally known data—e.g. time) that defines the node sequence is the based on the content being stored (all of which the client device 202 clearly knows).

Exemplary Optimal Data Placement Procedure

In a distributed data storage system having multiple data storage nodes, data can be placed optimally in the nodes with reference to failure tolerance, access speed, security and other design requirements including dynamic requirements that change during system operation. An exemplary optimal data placement method is as follows.

Step 1. Each data storage node's probability of failure is expressed as a correlation matrix C describing the likelihood of individual and pairwise failure. The correlation matrix can be estimated from industry data and node placement in the rack and data center—and after running for a while enhanced with real failure data. It is a relatively simple thing to calculate when individual components of the whole system are compared and assumed to be independent—rack power supplies, node power supplies, data center network switches, etc.

Step 2. A scoring algorithm provides a single number of fitness for a given set of N data storage nodes (208) IDs, using the correlated failure probabilities as described in the correlation matrix C.

Step 3. When adding a new storage node its ID must be selected from the IDs not already in use in the distributed system. By selecting a large number of options for this ID, and assessing the data placement that would occur if that ID were used at this time for this node (using the scoring function and associated failure correlation matrix), the best node ID can be selected.

Step 4. The data storage node set choice of step 2 is compared using the result from step 3 to the best choice so far. If this node choice is better, then it is preferred and saved. If it is worse, then it is discarded.

Step 5. If sufficient number of trials are completed, then the best placement of data storage node is reported. Otherwise, return to step 3, and step 3 is repeated.

This procedure can be carried out once at design time, i.e. before the system is installed, or at various times during operation as key parameters (e.g. the failure correlation matrix changes). If nodes are to be removed or added this process can determine the best IDs to remove, or add, as desired. Due to the iterative nature of the procedure it can even be run continuously and when a better placement is discovered, the system is updated to reflect this.

Exemplary Scenario

For better understanding, an exemplary scenario is considered. It can be considered that a distributed data storage system with only 8 hash bins and 8 possible node IDs. Here, "hash bin" is simply a numeric bound (lower and upper) of a range in a numeric space that is populated by generating hash codes. A hash code is a pseudo-random fixed bit-length number generated from arbitrary length content; typical hashing algorithms will fill a 16, 32 or 64 bit value. If one wants to group content together in fewer bins, then one simply puts each generated hash into one of the (non-overlapping) ranges and hence the term "binning" from statistics. Most often these ranges are all of equal length so there is about equal numbers of entries (i.e. content data hash) in each bin.

Figure 3:
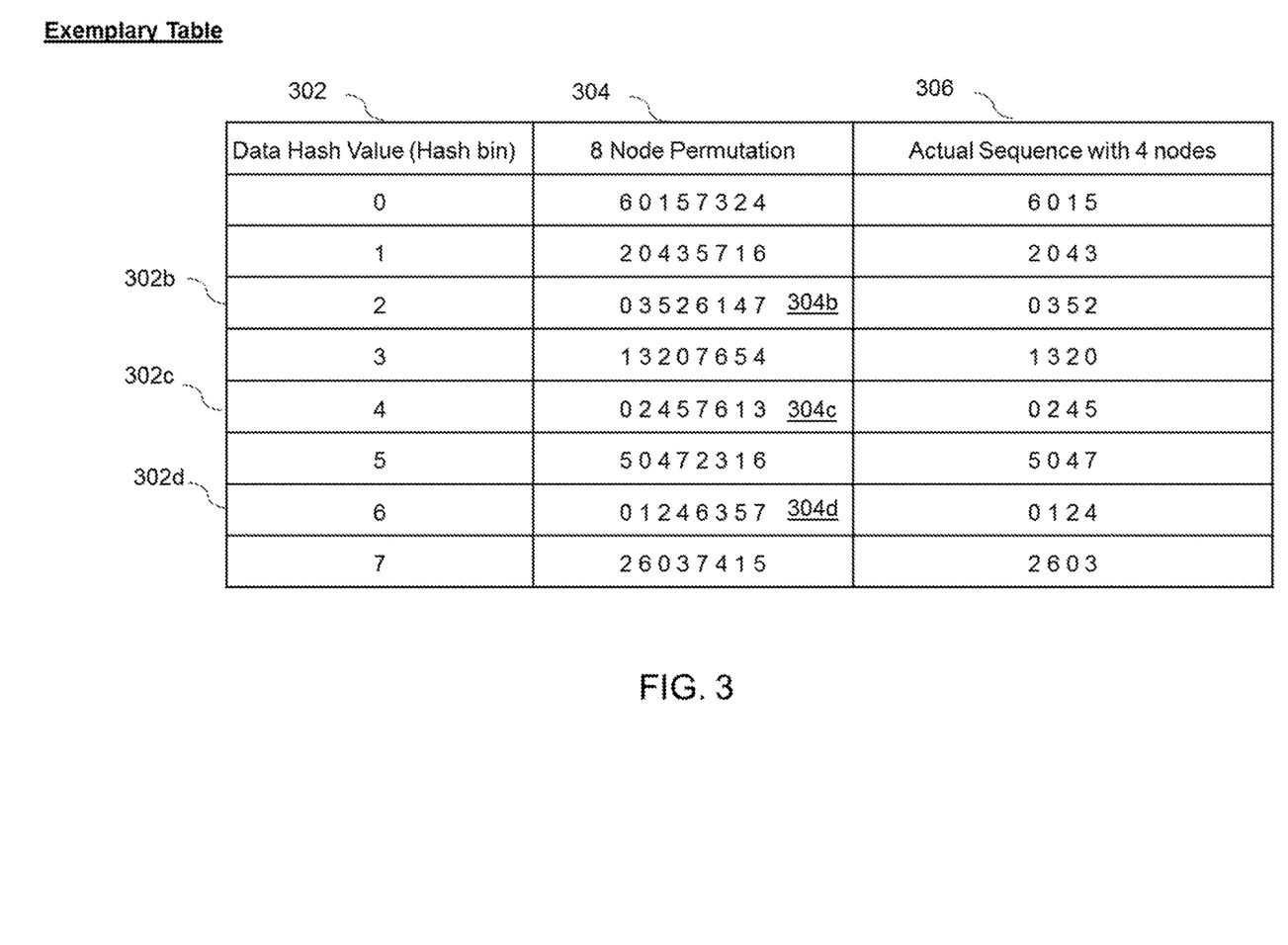
FIG. 3 shows an exemplary table indicating various node IDs and hash bins.

As shown in FIG. 3, reading left to right, node 0 (see 304b, 304c and 304d) is the primary node for hash bin 2, 4 and 6 (302b, 302c and 302d respectively). If it fails then requests to bin 2 will go to node 3, requests for bin 4 to node 2, and node 6 re-routes to node 1. Note that in this simple example, node 3 is not the primary node for any bin and so under normal operation would be mostly idle. This situation does not happen in practice with larger numbers of hash bins, and if clients also spread their requests out over the series of servers rather than always contacting the primary node.

Another important enhancement is for clients to bias their requests to server nodes that they find themselves "close" to (in terms of network latency). In the last column 306, the first 4 node IDs show how a client would view the storage system for data that had 4 fold redundancy (i.e. storing four copies of the same data in four different storages), and is free to ask any one of 4 nodes for data—biasing towards its closest node once a few requests show which node seems to be optimal for that client.

The key observation in FIG. 3 is that any new node can be allocated to any node ID that has not already been given out. There is no requirement for the 9th node to be assigned node ID=9, for a 16 bit system the next node could have almost any of 64000 IDs (2^16−8). Which one should be chosen? And why not node ID=9? The answer lies in the sequences that would be produced (and therefore what data would be stored on it) were it to be assigned node ID=9. Looking at the other nodes, one may determine that node ID=9, although randomly spread amongst the hash bins as expected, does in fact share a number of bins with node 8, and perhaps node 8 is physically located on the same rack as node 9. Note that this "rack awareness" can be considered at this late stage (node installation time) rather than having to be done all at the initial design time. So if node ID=9 is not the best, then the system can iterate through the 1000s of other possibilities and find the assignment that makes the new node co-incident as infrequently as possible to other nodes that already have been assigned. For this example it may be that using node ID=112 is the next best choice in terms of rack/data center independence. The essential features for this to work is that the PERMUTE function is sufficiently random, so it is highly likely that no matter what node IDs are already in use, and no matter what criteria currently in place for judging "best" selection, there is a "best" ID from the 1000s left to choose from. Hence we can always assign a "best" node ID to ensure overall system performance (minimizing impact of node failure, maximizing access speed, best data security etc).

Exemplary Method Flowchart—Storing Data

Figure 4:
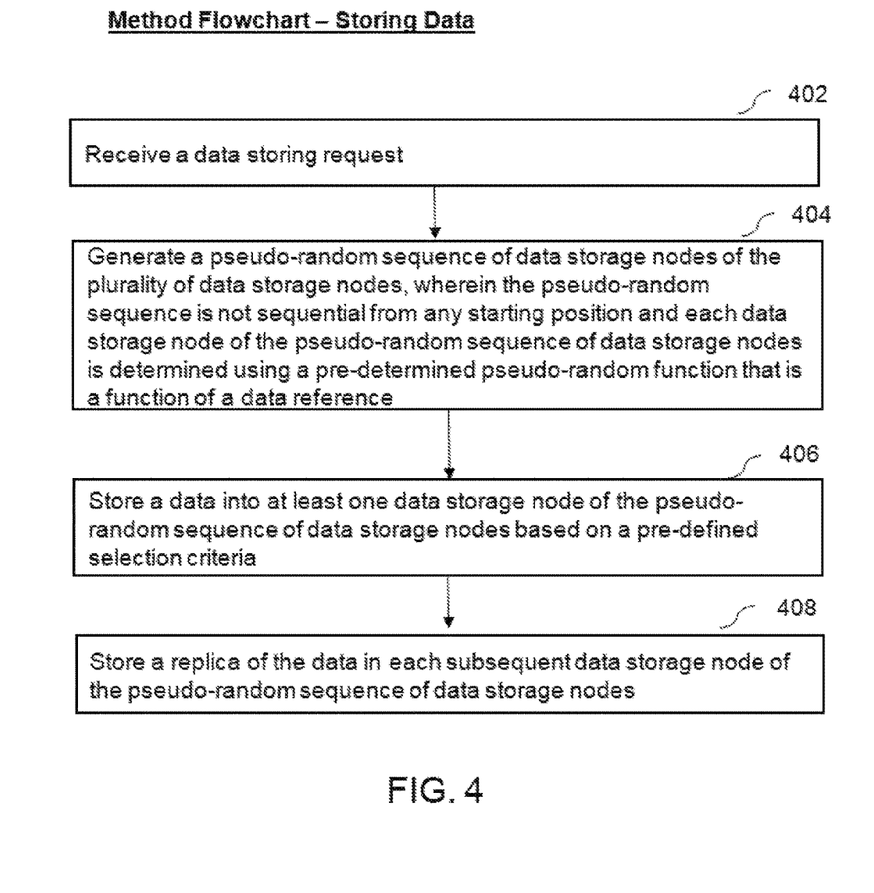
FIG. 4 illustrates a method flowchart for storing data in a distributed data storage system, according to an embodiment.

FIG. 4 illustrates a method flowchart for storing data in a distributed data storage system. The data storage system includes multiple data storage nodes. Various examples of the data storage nodes may be physical servers, for example. Each data storage node stores data in any formats such as comma-separated values, image file formats, plain text, audio file formats, Hypertext Mark-up Language (HTML), MS Word or the like. Each data storage node is represented by a unique node identification. The data storage nodes may be located at a single location. In other examples, the data storage nodes may be located at different locations.

The method flowchart is implemented when a user performs a storing operation i.e., to store data on data storage nodes. The user can store data on the storage nodes when required. To this end, the client device of the user communicates with one or more data storage nodes via an access server.

At 402, when a data storing request is received from the user, at 404, a pseudo-random sequence of data storage nodes of the multiple data storage nodes is generated. The pseudo-random sequence is not sequential from any starting position and the pseudo-random sequence of the data storage nodes is unique for the data. Each data storage node of the pseudo-random sequence of data storage nodes is determined using a pre-determined pseudo-random function. The pre-determined pseudo-random function includes a PERMUTE function. The pre-determined pseudo-random function is a function of a data reference corresponding to the data. The data reference corresponds to a hash code generated using a hashing algorithm on the data. Various examples of hashing algorithms include MD5, SHA-1, SHA-256, SHA-384 or a combination thereof.

At 406, a data is stored into at least one data storage node of the pseudo-random sequence of data storage nodes based on a pre-defined selection criteria. The pre-defined selection criteria can be determined by at least one of minimizing the impact of data storage node failure, maximizing access speed and maximizing data security.

Then, at 408, a replica of the data is stored in each subsequent data storage node of the pseudo-random sequence of data storage nodes.

In this manner, data of the user is stored in the distributed data storage system, where each storage node is active. If a data storage node fails, its data can be recovered by other nodes in the system.

Exemplary Method Flowchart—Accessing Data

Figure 5:
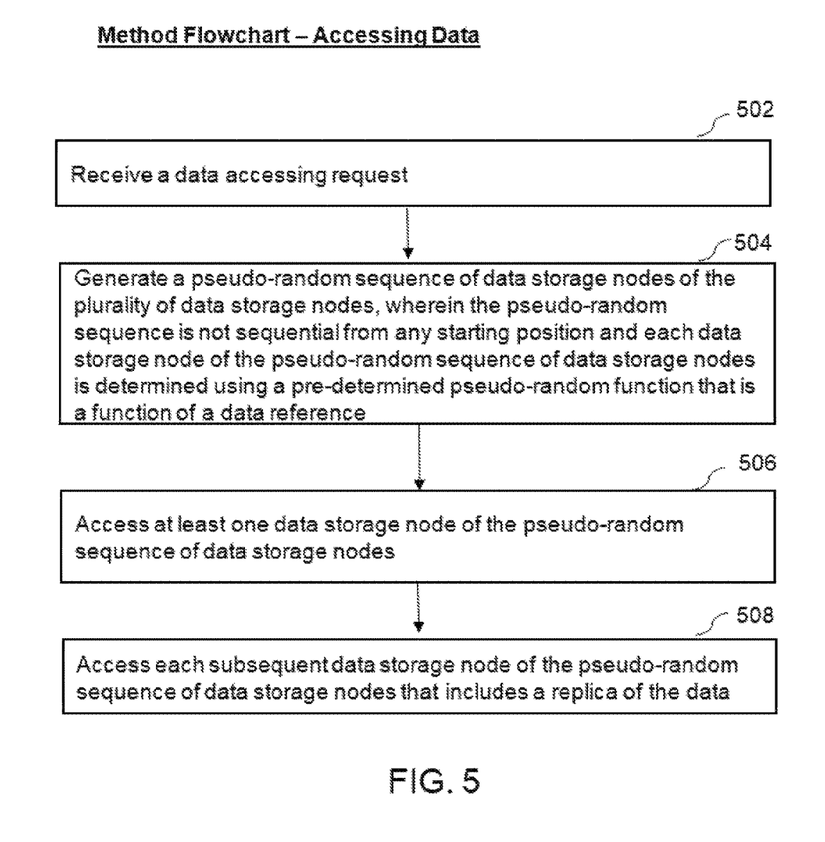
FIG. 5 illustrates a method flowchart for accessing data stored in a distributed data storage system, according to an embodiment.

FIG. 5 illustrates a method flowchart for accessing data in a distributed data storage system. The distributed data storage system includes multiple data storage nodes.

Initially, the method starts when a user wishes to access data stored on storage nodes. At 502, when an access request is received, at 504, a pseudo-random sequence of data storage nodes of the multiple data storage nodes is generated. The pseudo-random sequence data storage nodes represent the storage nodes where the requested data is stored. The pseudo-random sequence is not sequential from any starting position and the pseudo-random sequence of the data storage nodes is unique for the data. Each data storage node of the pseudo-random sequence of data storage nodes is determined using a pre-determined pseudo-random function. The pre-determined pseudo-random function includes a PERMUTE function. The pre-determined pseudo-random function is a function of a data reference corresponding to the data. The data reference corresponds to a hash code generated using a hashing algorithm on the data. Various examples of hashing algorithms include MD5, SHA-1, SHA-256, SHA-384 or a combination thereof.

At 506, a first data storage node of the pseudo-random sequence of data storage nodes that includes the data is identified and selected for data access.

At 508, if a data storage node fails, each subsequent data storage node of the pseudo-random sequence of data storage nodes that includes a replica of the data, is accessed.

The distributed data storage system as described in the present disclosure or any of its components, may be embodied in the form of a computer system. Typical examples of a computer system includes a general-purpose computer, a sever computer, a programmed microprocessor, a microcontroller, a peripheral integrated circuit element, and other devices or arrangements of devices that are capable of implementing the method of the present disclosure.

The computer system comprises a computer, an input device, a display unit and the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive or embedded drive such as a solid state disk etc. The storage device can also be other similar means for loading computer programs or other instructions into the computer system. The computer system also includes a communication unit. The communication unit communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include one or more commands that instruct the processing machine to perform specific tasks that constitute the method of the present disclosure. The set of instructions may be in the form of a software program. Further, the software may be in the form of a collection of separate programs, a program module with a larger program or a portion of a program module, as in the present disclosure. The software may also include modular programming in the form of object-oriented programming. The processing of input data by the processing machine may be in response to user commands, results of previous processing or a request made by another processing machine.

For a person skilled in the art, it is understood that these are exemplary case scenarios and exemplary snapshots discussed for understanding purposes, however, many variations to these can be implemented in order to detect objects (primarily human bodies) in video/image frames.

In the drawings and specification, there have been disclosed exemplary embodiments of the present disclosure. Although specific terms are employed, they are used in a generic and descriptive sense only and not for purposes of limitation, the scope of the present disclosure being defined by the following claims. Those skilled in the art will recognize that the present disclosure admits of a number of modifications, within the spirit and scope of the inventive concepts, and that it may be applied in numerous applications, only some of which have been described herein. It is intended by the following claims to claim all such modifications and variations which fall within the true scope of the present disclosure.

What is claimed is:

1. A method for storing data in a distributed data storage system, the method comprising:
   receiving a data storing request to store a block of data and one or more replicas of the block of data on data storage nodes of the distributed data storage system, each of the data storage nodes being associated with a corresponding unique node identifier (ID);
   calculating, using a hashing algorithm, a hash code corresponding to the block of data, the hash code being made up of a predetermined fixed number of bits and being calculated based on at least the content of the block of data;
   calculating a sequence of the unique node IDs associated with the data storage nodes, the sequence being associated with the block of data,
      wherein the sequence is calculated by performing a pseudo-random permutation of all potential unique node IDs keyed with at least the hash code corresponding to the block of data, and
      wherein the number of all potential unique node IDs is based on a total number of potential hash codes that can be calculated using the fixed number of bits; and
   storing the block of data and the one or more replicas in respective data storage nodes based on the calculated sequence of unique node IDs.

2. The method for storing data of claim 1, wherein a first data storage node corresponding to a first unique node ID in the sequence stores the block of data, and a group of one or more data storage nodes corresponding to one or more of the unique node IDs in the sequence that are positioned subsequent to the first unique node ID within the sequence stores the one or more replicas of the block of data.

3. The method for storing data of claim 1, wherein the storage of the block of data and the one or more replicas is further based on a pre-defined selection criteria configured to optimize the storage of data by at least one of minimizing the impact of data storage node failure, maximizing access speed and maximizing data security.

4. The method for storing data of claim 1, wherein the sequence of unique node IDs is unique for the block of data.

5. A method for accessing data in a distributed data storage system, the method comprising:
receiving a data accessing request to access a block of data or one or more replicas of the block of data from data storage nodes of the distributed data storage system, each of the data storage nodes being associated with a corresponding unique node identifier (ID),
wherein the block of data and the one or more replicas are stored in respective data nodes according to a calculated first sequence of unique node IDs associated with the block of data;
calculating, using a hashing algorithm, a hash code corresponding to the block of data, the hash code being made up of a predetermined fixed number of bits and being calculated based on at least the content of the block of data;
calculating a second sequence of the unique node IDs associated with the data storage nodes, the sequence being associated with the block of data,
wherein the second sequence is calculated by performing a pseudo-random permutation of all potential unique node IDs keyed with at least the hash code corresponding to the block of data, and
wherein the number of all potential unique node IDs is based on a total number of potential hash codes that can be calculated using the fixed number of bits; and
accessing at least one data storage node based on the second sequence of the unique node IDs, to access the block of data or one or more replicas of the block of data,
wherein the second sequence is equal to the first sequence.

6. The method for accessing data of claim 5, wherein a first data storage node corresponding to a first unique node ID in the second sequence has stored thereon the block of data, and a group of one or more data storage nodes corresponding to one or more of the unique node IDs in the second sequence that are positioned subsequent to the first unique ID within the second sequence have stored thereon the one or more replicas of the block of data.

7. The method for storing data of claim 5, wherein the first and second sequences of unique node IDs are unique for the data.

8. A non-transitory computer readable medium for storing and accessing data in a distributed data storage system, the non-transitory computer readable medium comprising a set of computer-executable instructions for performing a method comprising:
receiving a data storing request to store a block of data and one or more replicas of the block of data on data storage nodes of the distributed data storage system, each of the data storage nodes being associated with a corresponding unique node identifier (ID);
calculating, using a hashing algorithm, a hash code corresponding to the block of data, the hash code being made up of a predetermined fixed number of bits and being calculated based on at least the content of the block of data;
calculating a sequence of the unique node IDs associated with the data storage nodes, the sequence being associated with the block of data of the plurality of data storage nodes,
wherein the sequence is calculated by performing a pseudo-random permutation of all potential unique node IDs keyed with at least the hash code corresponding to the block of data, and
wherein the number of all potential unique node IDs is based on a total number of potential hash codes that can be calculated using the fixed number of bits; and
storing the block of data and the one or more replicas in respective data storage nodes based on the calculated sequence of unique node IDs.

9. The non-transitory computer readable medium of claim 8 further includes computer-executable instructions for performing a method comprising:
accessing at least one data storage node based on the sequence of unique node IDs in response to receiving a data accessing request.

10. The non-transitory computer readable medium of claim 8, wherein a first data storage node corresponding to a first unique node ID in the sequence stores the block of data, and a group of one or more data storage nodes corresponding to one or more of the unique node IDs in the sequence that are positioned subsequent to the first unique node ID within the sequence stores the one or more replicas of the block of data.

11. The non-transitory computer readable medium of claim 8, wherein the storage of the block of data and the one or more replicas is further based on a pre-defined selection criteria configured to optimize the storage of data by at least one of minimizing the impact of data storage node failure, maximizing access speed and maximizing data security.

12. The non-transitory computer readable medium of claim 8, wherein the sequence of unique node IDs is unique for the block of data.

13. A distributed data storage system configured to store and access data, the distributed data storage system comprising:
a plurality of data storage nodes each associated with a corresponding unique node identifier (ID); and
an access server configured to:
receive a data storing request to store a block of data and one or more replicas of the block of data on data storage nodes of the distributed data storage system,
calculate, using a hashing algorithm, a hash code corresponding to the block of data, the hash code being made up of a predetermined fixed number of bits and being calculated based on at least the content of the block of data,
calculate a sequence of the unique node IDs associated with the data storage nodes, the sequence being associated with the block of data,
wherein the sequence is calculated by performing a pseudo-random permutation of all potential unique node IDs keyed with at least the hash code corresponding to the block of data, and
wherein the number of all potential unique node IDs is based on a total number of potential hash codes that can be calculated using the fixed number of bits; and
store the block of data and the one or more replicas in respective data storage nodes based on the calculated sequence of unique node IDs.

14. The distributed data storage system of claim 13, wherein the access server further configured to access at least one data storage node based on the sequence of unique node IDs in response to receiving a data accessing request.

15. The distributed data storage system of claim 13, wherein a first data storage node corresponding to a first unique node ID in the sequence stores the block of data, and a group of one or more data storage nodes corresponding to one or more of the unique node IDs in the sequence that are positioned subsequent to the first unique ID within the sequence stores the one or more replicas of the block of data.

* * * * *